United States Patent [19]

Ohta et al.

[11] 3,743,771

[45] July 3, 1973

[54] TELEVISION REPRODUCER FOR A MOVIE FILM

[75] Inventors: Takahiro Ohta; Masahiro Ohnishi, both of Asaka-shi, Japan

[73] Assignee: Fuji Photo Film Co., Ltd., Kanagawa, Japan

[22] Filed: July 28, 1971

[21] Appl. No.: 166,880

[30] Foreign Application Priority Data

July 28, 1970 Japan ............................ 45/65859

[52] U.S. Cl. ........................ 178/7.2, 178/DIG. 28

[51] Int. Cl. ........................................ H04n 5/36

[58] Field of Search .................... 178/DIG. 28, 7.2

[56] References Cited

UNITED STATES PATENTS

| | | | |
|---|---|---|---|
| 3,584,148 | 6/1971 | Flory | 178/DIG. 28 |
| 3,067,282 | 12/1962 | Hammans | 178/6.8 |
| 2,506,198 | 5/1950 | Charles | 178/DIG. 28 |
| 2,523,296 | 9/1950 | Harris | 178/DIG. 28 |
| 2,651,674 | 9/1953 | Theile | 178/7.2 |

*Primary Examiner*—Robert L. Griffin
*Assistant Examiner*—Joseph A. Orsino, Jr.
*Attorney*—Richard C. Sughrue, John H. Mion, et al.

[57] ABSTRACT

A television reproducer for a movie film (cine film) which has a device for flashing in synchronism with a detected frame signal. The frame signal indicates the position of a frame of a continuously fed movie film. A vidicon device scans vertically a plurality of fields within a flash duration with a scan frequency of 60 fields per second of a standard television system. The scanning frequency is obtained from the frame signal. The reproducer also includes a circuit for varying the amplification degree of video signals in synchronization with the frame signal for preventing flickers. Thus, the film may be projected to the television without any special devices.

4 Claims, 4 Drawing Figures

INVENTOR
TAKAHIRO OHTA
BY Sughrue, Rothwell, Mion, Zinn & Macpeak
ATTORNEY

TELEVISION REPRODUCER FOR A MOVIE FILM

BACKGROUND OF THE INVENTION

1. Field of the Invention

This invention relates to a television reproducer for a movie film, and more particularly to a device for projecting 8mm film on a general television receiver.

2. Description of the Prior Art

It is well known that 8mm film is projected at 18 frames per second whereas television has 30 pictures (60 fields) per second. The television reproducer of this invention feeds the pictures in such a manner that one frame of 8mm film corresponds to 3 fields of the television. The reproducer of this invention does not require the complicated operation of a 2–3 scratching system used to apply pictures of 16mm or 35mm movie film (24 frames per second) to a television, but may project a continuous film fed to the television without any modification of the television receiver, thereby producing good pictures similar to those reproduced from the normal radiowaves from the terminal of the antenna.

SUMMARY OF THE INVENTION

According to one aspect of this invention, there is provided a television reproducer for a movie film which comprises means for flashing in synchronism with a detected frame signal. The frame signal indicates the position of a frame of a continuously fed movie film. A vidicon means scans vertically a plurality of fields within a flash duration with a frequency near 60 fields per second of a standard television system. The scanning frequency is obtained from the frame signal. The reproducer also includes a circuit means for varying the amplification degree of video signals in synchronization with the frame signal thereby preventing flickers.

It is an object of this invention to provide a television reproducer for a movie film which may reproduce continuously fed film without any modification of the television receiver.

The other objects, features and advantages of this invention will become apparent from the following description taken in conjunction with the accompanying drawings, in which:

DESCRIPTION OF THE PREFERRED EMBODIMENT

Figure 1:
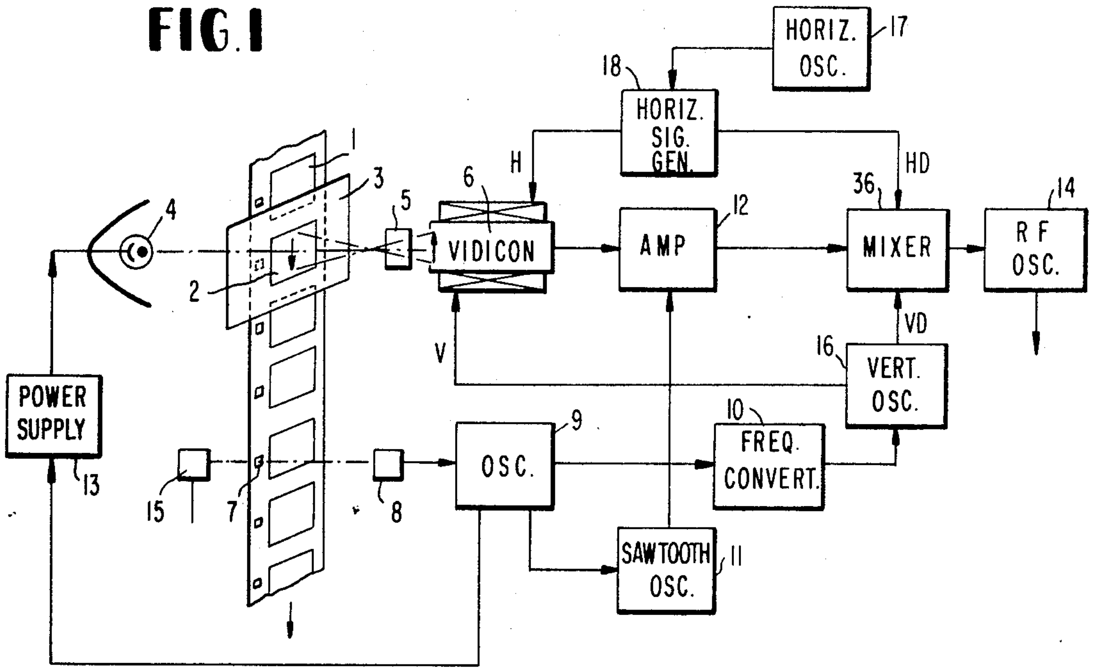
FIG. 1 is a block diagram of the preferred embodiment of the television reproducer of this invention.

Reference is now made to the drawings, and particularly to FIG. 1, which shows the preferred embodiment of the television reproducer of this invention.

8mm film 1 is continuously fed out at a constant speed of 18 frames per second by a capstan system. When one frame 2 of the film reaches the center of a gate 3, the film is illuminated for short times by a flash lamp 4 so that a picture of one frame is focused by a lens series 5 on a photoconductive surface of a vidicon

6. In this case, since the flashing time of the flash lamp 4 is approximately $10^{-4}$ to $10^{-5}$ second, even if the film is continuously moved, stationary pictures are focused on the photoconductive surface. The continuous type of feeding system is advantageous since the dust of the film is not produced and the mechanical structure of the film feeding device is very simple. The light from a luminous element 15 is detected through a feeding hole 7 of the 8mm film by a photoelectric converting element 8 to produce a frame signal comprising a pulse which is applied as a trigger to an oscillator 9, oscillating at approximately 18Hz, so that the oscillator 9 is synchronized with the feeding rate of the film which is fed at 18 frames per second. The pulse output of 18Hz is applied to the flash lamp power supply 13 so that the flash lamp 4 is flashed at 18Hz.

The signal of 18Hz from the film may be detected by the aforesaid photodetecting system, or may be detected by the combination of a sprocket roller 19 for generating a signal of free rotation and a proximity switch 21 with a gear 20.

When the photodetecting system is used, the oscillator 9 is self-oscillated at 18Hz to obtain a vertical synchronizing signal.

The vidicon has a considerably long image storage effect. For this reason, it is normal that after the flash lamp has flashed once, the signal current is retained in the amount of 10 to 30 percent even after a time lapse of 3 fields of the television. Here, when one frame of 8mm film reaches the center of the gate, it is flashed with a strong flash from the flash lamp to scan 3 fields of the vidicon until the next frame reaches the center of the gate. That is, it utilizes the image storage effect of the vidicon so that the one frame of 8mm film corresponds to 3 fields of the television. Therefore, the image according to this reproducer becomes $18 \times 3 = 54$ fields.

The pulse signal of 18Hz from the oscillator 9 in FIG. 1 is applied to a frequency converter 10 so as to obtain 3 times the frequency or 54Hz of signal. This signal is applied to the vertical oscillator 16 of the vidicon to be amplified and shaped to obtain a vertical synchronizing signal and vertical deflection sawtooth wave. The horizontal signal is obtained by a horizontal signal generator 18 from a 75KHz horizontal oscillator 17 as a horizontal synchronous signal and horizontal deflection sawtooth wave.

The output signal of the vidicon is amplified by an amplifier 12 so that a composite video signal is obtained by adding the vertical and horizontal synchronous signals in mixer 36. These signals are modulated by a carrier frequency of a vacant channel of the television by RF oscillator 14. This signal may be received directly from the terminal of the antenna of the television receiver. General television signals may synchronize sufficiently in vertical synchronization in the 50 to 60Hz range by adjustment of the knob of vertical synchronization. If one frame of 8mm film is made to correspond to 3 fields of the television, it becomes a 54Hz field frequency, and therefore falls within this range.

Figure 3:
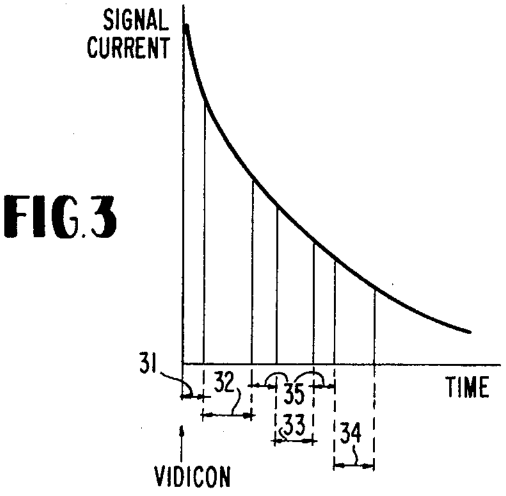
FIG. 3 is a graph showing the signal current characteristics of vidicon.
Figure 4:
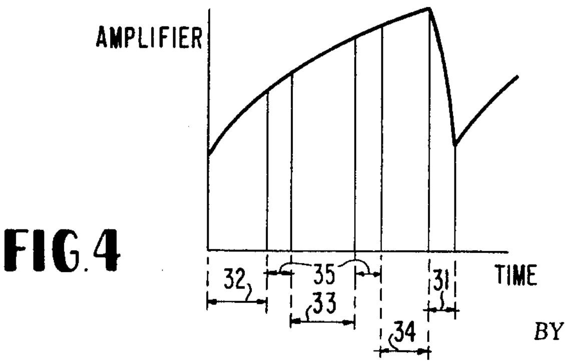
FIG. 4 is a graph showing the total characteristics of amplifier in this invention.

However, as shown in FIG. 3, the picture becomes gradually dark from the flashing of the flash lamp through first field 32, second field 33, and third field 34 due to the attenuation of the image storage effect of the time lapse of the vidicon, and accordingly flickers of 18 times per second are present. Numeral 35 illustrates vertical flyback line. The compensation of the flicker effect has gain characteristics opposite to the image storage characteristics of the vidicon as seen in FIG. 4, that is, this is performed by using an amplifier for amplifying increasingly as shown in FIG. 4 at a frequency of 18Hz from first field, second field to third field. Further in detail, a sawtooth output is obtained from a sawtooth wave oscillator 11 triggered by a pulse from the oscillator 9 of 18Hz. If this sawtooth wave is applied to the bias circuit of preamplifier 12 in the vidicon, an amplifier having the characteristics shown in FIG. 4 is obtained.

The compensation is also obtained by applying the sawtooth wave amplified and shaped to the target voltage of the vidicon 6. An image or picture presenting no flickers is reproduced by either method set forth above.

Figure 2:
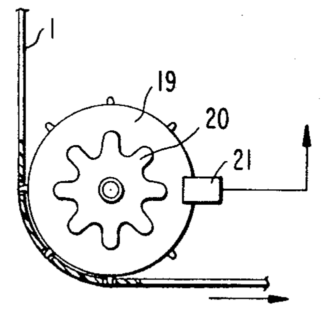
FIG. 2 is a schematic view of one embodiment of a device for generat-ing a frame signal in accordance with this invention.

The flashing is advanced by the time indicated by 31 from the start of the scanning of the vidicon so that the difference of the vidicon signal current during 3 field scanning after flashing is made as small as possible. The time corresponding to 31 is provided for full horizontal flyback duration. This is readily possible by displacing the position of the signal blanking portion of 18Hz from the film. That is, it is made by delaying the flashing time from the frame signal by utilizing the time constant determined by an RC circuit in the power supply 13. Or, in FIG. 2, it is provided by mechanically displacing the position of the sprocket 19 relative to the gear 20. Thus, the variation of the signal current from the vidicon of first to third field duration is made small so as to lighten the load of the amplifier in order to obtain a video signal having a small flicker.

Though the number of frames of 8mm film is limited to 18 frames, if one frame is made to correspond to 4 fields of the television when using 8mm film of conventional 16 frames, the device may be operated by entirely the same process.

It should be understood from the foregoing description that according to the reproducer of this invention 8mm film may be projected on the common television without using complicated mechanical mechanism such as scratching which produces noise, and using a continuous feeding mechanism without any modification of the television receiver and without using a special storage-type camera tube.

While the invention has been particularly shown and described with reference to preferred embodiments thereof, it will be understood by those skilled in the art that various changes in form and details may be made therein without departing from the spirit and scope of the invention.

We claim:

A television reproducer for a movie film comprising:

a. frame signal generating means for generating a signal upon detection of a frame of said film;

b. flashing means for illuminating a frame of said film once in response to the output of said frame signal generating means;

c. vidicon means responsive to the light from said flashing means for vertically scanning a plurality of fields of a television system after each illumination of said frame by said flashing means, wherein said television system has a scanning frequency near 60 fields per second; and d. circuit means for varying the amplification of the video signal output of said vidicon in synchronization with said frame signal generating means to prevent flickers.

2. The television reproducer as set forth in claim 1 wherein said frame signal generating means comprises:

a. a luminous element;

b. a photoelectric converting means for detecting the output of said luminous element; and c. an oscillator means responsive to said photoelectric converting means for oscillating at a frequency proportional to the output of said photoelectric converting means; and wherein said flashing means comprises:

d. a flash lamp; and e. power supply means responsive to said oscillator means for supplying power to said flash lamp, whereby said flash lamp flashes at the frequency of said oscillator means.

3. The television reproducer as set forth in claim 1 wherein said vidicon means has a storage effect such that one frame of said film corresponds to three fields of said television system.

4. The television reproducer as set forth in claim 3 wherein said circuit means comprises an amplifier having a gain characteristic which is opposite to the storage characteristic of said vidicon means.

* * * * *